E. C. DALLEINE.
COFFEE URN.
APPLICATION FILED SEPT. 25, 1908.
918,974. Patented Apr. 20, 1909.
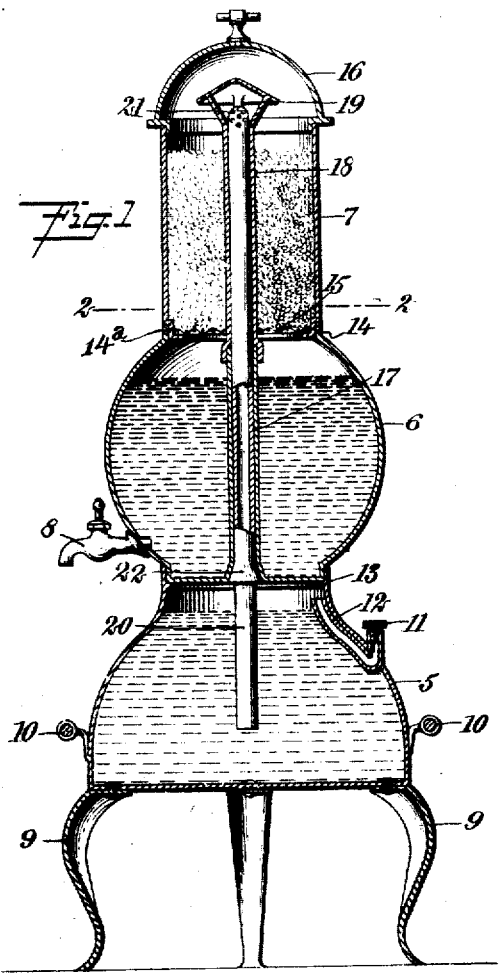
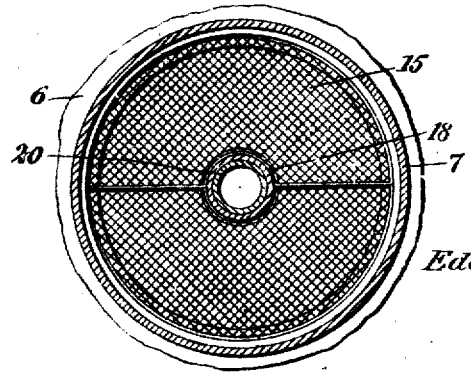
WITNESSES
INVENTOR
Edouard C. Dalleine
BY
ATTORNEYS

UNITED STATES PATENT OFFICE.

EDOUARD C. DALLEINE, OF NEW YORK, N. Y.

COFFEE-URN.

No. 918,874.　　　Specification of Letters Patent.　　　Patented April 20, 1909.

Application filed September 25, 1908. Serial No. 454,677.

*To all whom it may concern:*

Be it known that I, EDOUARD C. DALLEINE, a citizen of the Republic of France, and a resident of the city of New York, borough of Manhattan, in the county and State of New York, have invented a new and Improved Coffee-Urn, of which the following is a full, clear, and exact description.

The invention is an improved coffee urn in which the water under steam pressure is automatically distributed over the coffee and percolates therethrough and then passes into the coffee pot, where it is maintained near but always slightly below the boiling point.

To this end the invention in general consists of a boiler, a coffee pot seated on the boiler, a coffee container seated on the coffee pot and having a perforated bottom, and a tube leading from a point below the normal liquid level in the boiler to a point above the coffee in the container.

Reference is to be had to the accompanying drawings forming a part of this specification, in which similar characters of reference indicate corresponding parts in both views.

Figure 1 is a central vertical section of a coffee urn embodying my invention; and Fig. 2 is a cross-section of the same substantially on the line 2—2 of Fig. 1.

The invention essentially consists of a boiler 5, a coffee pot 6 and a coffee container 7, which are shown to be arranged one above the other, with the boiler at the bottom, the container at the top and the pot occupying an intermediate position and having a faucet 8 near its bottom for drawing off the coffee. The boiler 5 is shown to be supported at a substantial elevation by legs 9, and has the general shape of a kettle with handles 10 arranged at opposite sides. At one side of the boiler a vent or plug 11 is provided, which is acted on by the steam pressure through a tube 12 which leads from a point above the normal water level. The neck of the boiler is shown to be constructed with an inwardly-projecting flange 13, slightly depressed below its top edge, on which seats the reduced bottom portion of the pot 6, this portion of the pot closely fitting the boiler and forming in connection therewith a substantially steam-tight joint.

In order to carry out the ornamental effect of the urn, the pot 6 is preferably in the form of a globe, and has an open upper end skirted by a flange 14 which receives the reduced portion of the container 7, the shoulder 14ᵃ produced by said reduced portion seating on the top edge of the flange 14. The container 7 has a reticulated or perforated bottom 15, and a dome-shaped cover 16.

From the center of the pot 6 rises an upright tube 17, and over the upper end of this tube telescopes the expanded lower end of a similar tube 18, the latter being rigidly secured to the bottom of the container 7 and provided at its upper end, within or near the dome cover 16, with a hood 19. A tube 20 is detachably engaged within the tube 17 and snugly fits the same, as also the tube 18, and leads from a point below the normal water level in the boiler to a point slightly below the hood and above the coffee in the container, at which point it has a perforated end 21. The securing of the tube 20 to the coffee pot may be carried out in any desired manner, which, in the present form of the invention, is shown to be effected by constructing the lower end of the tube 17 of conical shape and providing the tube 20 at its point with a corresponding conical portion 22.

The construction of the urn as shown and described admits of the separation of the three principal parts, also a removal of the tube 20, whereby the entire urn may be thoroughly cleansed after using.

In the use of the urn, the boiler is filled with water to about the level indicated, and within the coffee container is placed the quantity of ground or pulverized coffee required to make the amount of coffee wanted. Suitable heat, as an alcohol lamp or other burner, is then applied to the boiler, and as the steam pressure sufficiently rises it forces the boiling water through the tube 20, and by reason of its perforated upper end 21 and the hood 19, the water is thoroughly scattered over the surface of the coffee within the container, the hood serving not only to scatter the water, but also to prevent the same from being forced against the dome 16. The water after falling over the coffee percolates therethrough and passes through the perforated bottom of the container into the coffee pot, where it may be drawn off for use through the faucet 8. Should the water pass too rapidly through the tube 20, the flow may be lessened by partly opening the vent 11, or the flow may be entirely stopped through the tube by removing this plug, in which case the steam from the boiler will pass out through the tube 12. Ordinarily the vent will be slightly opened during the making of the coffee, unless the operation is to be hastened, in which event the plug is screwed in tight. No matter how fast the steam is generated in the boiler, the coffee in the coffee pot never boils but is always maintained below a boiling temperature.

Having thus described my invention, I claim as new and desire to secure by Letters Patent:

1. The combination of a water receptacle, a coffee pot seated on the receptacle and having a fixed upright tube, a coffee container seated on the coffee pot and having a perforated bottom, an upright tube fixed to the bottom of the container and telescoping over the tube in the pot, a hood carried at the upper end of the tube within the container, and a tube leading from the receptacle to a point slightly below said hood and closely fitting the first mentioned tubes.

2. The combination of a boiler, a coffee pot seated on the boiler having a tube rising from the bottom thereof, with that portion of the tube adjacent to the bottom of the pot of conical form, a coffee container seated on the coffee pot, having a tube attached to the bottom thereof and telescoping over the upper end of the first mentioned tube, and a tube passing from a point near the bottom of the boiler to a point near the top of the coffee container, closely fitting the first mentioned tubes and having a conical member frictionally engaging in the conical lower end of the first mentioned tube.

In testimony whereof I have signed my name to this specification in the presence of two subscribing witnesses.

EDOUARD C. DALLEINE.

Witnesses:
ROBERT W. HARDIE,
JOHN P. DAVIS.